(12) United States Patent
Makled et al.

(10) Patent No.: US 10,791,439 B2
(45) Date of Patent: Sep. 29, 2020

(54) METHODS AND SYSTEMS FOR VEHICLE DATA UPLOAD

(71) Applicant: Ford Global Technologies, LLC, Dearborn, MI (US)

(72) Inventors: Daniel A. Makled, Dearborn, MI (US); Jeremy Ferack, Livonia, MI (US); Michael McQuillen, Warren, MI (US); Brian Wolski, Dearborn, MI (US); Matthew Affeldt, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 15/896,743

(22) Filed: Feb. 14, 2018

(65) Prior Publication Data

US 2019/0253853 A1    Aug. 15, 2019

(51) Int. Cl.
| | | |
|---|---|---|
| *G06F 15/173* | (2006.01) | |
| *H04W 4/46* | (2018.01) | |
| *H04W 84/18* | (2009.01) | |
| *H04L 29/08* | (2006.01) | |
| *H04W 4/44* | (2018.01) | |

(52) U.S. Cl.
CPC ............ *H04W 4/46* (2018.02); *H04L 67/04* (2013.01); *H04W 4/44* (2018.02); *H04W 84/18* (2013.01)

(58) Field of Classification Search
CPC ......... H04W 4/46; H04W 4/44; H04W 84/18; H04L 67/04
See application file for complete search history.

(56) References Cited

U.S. PATENT DOCUMENTS

| | | | |
|---|---|---|---|
| 8,406,683 B2 * | 3/2013 | Oesterling | G07C 5/085 340/445 |
| 8,418,039 B2 | 4/2013 | Birmingham et al. | |
| 8,885,498 B2 | 11/2014 | Choi | |
| 10,466,717 B1 * | 11/2019 | Su | G06N 20/00 |
| 2016/0119739 A1 | 4/2016 | Hampel et al. | |
| 2017/0142187 A1 * | 5/2017 | Pimentel | H04L 67/06 |

FOREIGN PATENT DOCUMENTS

WO    WO 201746440 A1    3/1917

* cited by examiner

*Primary Examiner* — Thanh T Nguyen
(74) *Attorney, Agent, or Firm* — Frank Lollo; Eversheds Sutherland (US) LLP

(57) ABSTRACT

Embodiments provide a vehicle that can establish a network of nearby vehicles in order to upload large amounts of data. An example vehicle includes a sensor, a communication system, and a processor. The processor is configured to establish a network comprising a plurality of nearby vehicles having respective data upload rates, separate data gathered by the sensor into segments based on the respective data upload rates, and transmit to the plurality of nearby vehicles using the communication system (i) the segments, and (ii) instructions for uploading the segments to a server.

22 Claims, 3 Drawing Sheets

METHODS AND SYSTEMS FOR VEHICLE DATA UPLOAD

TECHNICAL FIELD

This application generally relates to vehicle data upload and, more specifically, methods and systems for uploading vehicle data using multiple vehicles.

BACKGROUND

Many vehicles include sensors that gather information about the vehicle surroundings, including visual data such as images and video, as well as vehicle system information such as various system states, metrics, diagnostic values, and more. This information can be used to diagnose vehicle issues, train autonomous vehicles, determine larger traffic trends, improve safety, and for various other purposes. Many vehicles also include the ability to communicate with each other (V2V communication) as well as with infrastructure (V2I), such as cell networks, roadside devices, and more.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application Example embodiments are shown describing systems, apparatuses, and methods for segmenting and transmitting vehicle data to a server using a network of vehicles. An example disclosed vehicle includes a sensor, a communication system, and a processor. The processor is configured to establish a network comprising a plurality of nearby vehicles having respective data upload rates. The processor is also configured to separate data gathered by the sensor into segments based on the respective data upload rates. And the processor is further configured to transmit to the plurality of nearby vehicles using the communication system (i) the segments, and (ii) instructions for uploading the segments to a server.

An example disclosed method for vehicle data upload includes establishing a network comprising a plurality of nearby vehicles having respective data upload rates. The method also includes separating data gathered by a sensor into segments based on the respective data upload rates. And the method further includes transmitting to the plurality of nearby vehicles using a communication system (i) the segments, and (ii) instructions for uploading the segments to a server.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
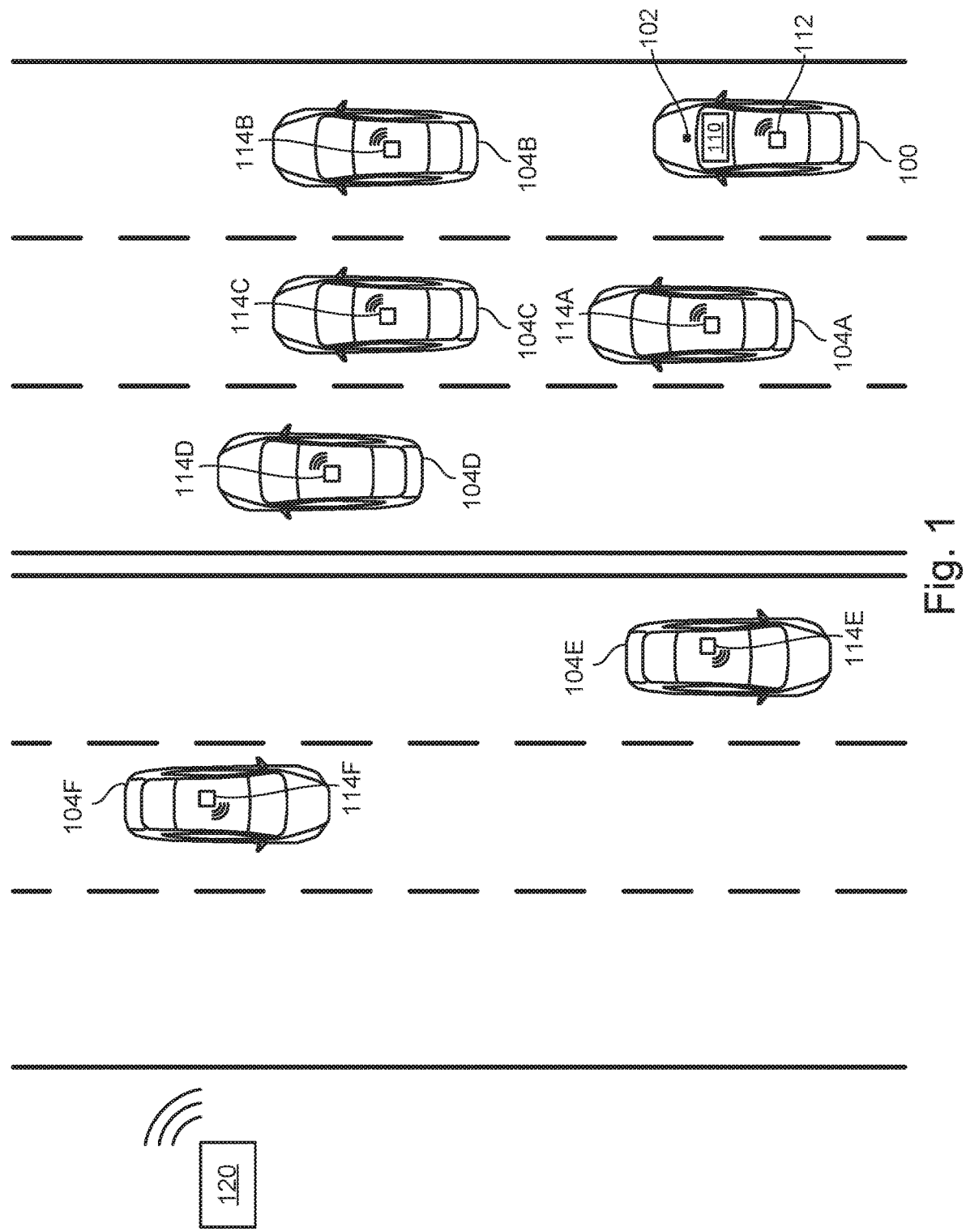
FIG. 1 illustrates a vehicle in an example scenario in which a vehicle data upload may occur according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, many vehicles may include sensors and other devices or systems that gather information about the vehicle settings, diagnostics, surroundings, and other data corresponding to the vehicle. This information may be useful for analysis of the vehicle and surroundings, to improve vehicle operation and safety. In particular, vehicles including advanced driver assistance systems (ADAS) may capture raw images and video which can be used to debug the system.

In some examples, vehicles may include systems and devices configured to transmit and receive information over the air (OTA), so as to transfer data gathered by the vehicle to a server or other computing device for analysis and debugging. Vehicle to vehicle (V2V) communication, vehicle to infrastructure (V2I) communication, and other vehicle communication (V2X) may be used to transfer data for one or more purposes.

The data collected by a vehicle may include images and video, which can take up a relatively large amount of storage space and require a large amount of bandwidth or a long time to transfer. HD video in particular can be captured at a rate of many megabytes per second, requiring a high bandwidth to transfer.

Hardware, network, and/or regulatory restraints on vehicle communication may limit the amount of data that can be uploaded from a vehicle and/or a rate at which the data can be transferred. For instance, the upload rate of a particular vehicle may be limited to 10 Mbps. Where the amount of data to be transferred is much larger, it may take a very long time to transfer the data. And if the vehicle continues to capture data at a rate larger than the upload rate, a backlog of data may continually grow even as data is uploaded from the vehicle.

With these issues in mind, example embodiments of the present disclosure may employ the use of an ad hoc vehicle network to upload segments of the larger block of data sought to be uploaded by a given vehicle. When an amount of data to be uploaded exceeds a given threshold (either in size or in upload time required), the vehicle may carry out one or more of the actions described herein to distribute the data to nearby vehicles for independent upload to a server. As described below, the vehicle may develop an ad hoc network of nearby vehicles and transmit segments of the data to the vehicles based on their individual upload rates. The data may be transmitted V2V using vehicle communication systems, such as a dedicated short range communication (DSRC), which may have data rate higher than that of a communication between the vehicle and a cell network or other infrastructure. Each vehicle in the network may then transmit its respective segment of the data to the server. The server may keep track of which segments have been received or not, and where a segment has not been received or where there is an error, the server may communicate this to the vehicle. The vehicle may then retransmit the missing segment to another vehicle in the network for upload to the server, or upload the missing segment itself. Thus, embodiments of the present disclosure may allow a vehicle to capture and upload larger amounts of data through the use of multiple vehicle communication channels by developing an ad hoc vehicle network of nearby vehicles.

FIG. 1 illustrates an example scenario in which embodiments of the present disclosure may occur. FIG. 1 shows a vehicle 100, and a plurality of nearby vehicles 104A-104F having respective communication systems 114A-F. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a sensor 102, a processor 110, and a communication system 112. FIG. 1 also illustrates six nearby vehicles 104A-F. It should be noted that although FIG. 1 shows a road having three lanes in each direction, with five vehicles travelling in a first direction and two travelling in a second direction, other orientations, lane numbers, numbers of vehicles, and other factors may be different while remaining within the scope of this disclosure. FIG. 1 shows a scenario for illustrative purposes only and should not be understood as limiting to scope of the disclosure only to what is shown.

Sensor 102 of vehicle 100 may be configured to gather data, such as images, video, and other data described herein. Sensor 102 may thus be a camera, a microphone, a diagnostic system or device, and more. Further, sensor 102 may be a single device or system, or may be multiple devices or systems. Sensor 102 may be positioned in one location or in many locations, inside our outside of vehicle 100, in any suitable orientation.

The data captured by sensor 102 may include images, audio, system states, system metrics, system diagnostics, and more. This data may be used to perform analysis of the vehicle operation, nearby traffic, to diagnose or debug vehicle systems, and for various other purposes. The data captured by sensor 102 may be transferred to server 120 for these purposes.

Processor 110 may be configured to carry one or more functions described herein. For example, processor 110 may be configured to determine characteristics of the gathered data, including a size of the data and a time required to upload the data to server 120 from vehicle 100. Processor 110 may also be configured to determine a data upload rate of vehicle 100, and responsively determine whether or not to upload the data to server 120 on its own.

In some examples, processor 110 may be configured to determine whether one or more additional vehicles should be used to upload the data to the server 120. This determination may be based on a determination that an expected upload time is greater than a threshold, such as a few minutes or more. In addition, processor may determine that additional vehicles should be used to upload the data based on a file size of the data to be uploaded, independent from the expected upload time. For example, processor 110 may determine that data from the sensor 102 comprising a size greater than one GB should be segmented and uploaded to server 120 by several vehicles, as described below. Other threshold may be used as well.

Processor 110 may also establish an ad hoc network of nearby vehicles based on the determination that additional vehicles should be used to upload the data. The ad hoc network of vehicles may include all nearby vehicles (e.g., vehicles 104A-F), or a subset of nearby vehicles (e.g., vehicles 104A-D).

In order to establish the ad hoc network, processor 110 may first broadcast a request for information from one or more nearby vehicles. The requested information may then be used to determine whether or not to include a given vehicle in the ad hoc network. The requested information may include the respective upload rates of each nearby vehicle. The requested information may also include route or guidance data corresponding to each vehicle. The guidance data may indicate a direction of movement of the respective vehicle, a planned route of the vehicle including locations and timing of travel, as well as various other information pertaining to the vehicle position and movement. The requested information may further include communications information, such as upload rates, networks and communications protocols available, and more. Other information may also be requested by vehicle 100, and may include any metric of the nearby vehicles 104A-F that may be used to determine whether or not to include each respective vehicle in the ad hoc network.

During or after receiving the information from the nearby vehicles 104A-F, processor 110 may determine whether or not to include one or more of the vehicles 104A-F in the ad hoc network. In some examples, all nearby vehicles may be included in the ad hoc network. In other examples, only a subset of the nearby vehicles may be included. Any vehicle that is within range of the communication system (e.g., within range of the DSRC communication) of vehicle 100 may be included as a possible vehicle in the list of vehicles for the ad hoc network.

In some examples, processor 110 may select a specific number of nearby vehicles, or a specific combination or subset of nearby vehicles based on one or more factors. The factors may include selecting based on a highest upload rate. The upload rate of each nearby vehicle may be determined by processor 110, and the vehicles may be ranked. The vehicles having the highest upload rates may then be selected to be added to the ad hoc network. In some examples, the routes and/or guidance information of each nearby vehicle may be compared to the route and guidance information of vehicle 100. The vehicles having the most similar routes may be selected, providing vehicle 100 the longest possible time in which to communicate with the selected nearby vehicles.

For example, in FIG. 1 nearby vehicles 104A-D may have similar planned routes to vehicle 100, while vehicles 104E and 104F do not. This is because vehicles 104E and 104F are travelling in the opposite direction from vehicle 100. In this case, vehicles 104A-D may be selected for the ad hoc network, while vehicle 104E and 104F are not.

In another example, one or more nearby vehicles may have a planned route indicating that the vehicle is expected to exit the road along which vehicle 100 is travelling. This may be vehicle 104B in FIG. 1. Where a planned route of vehicle 100 includes continuing along the road and not exiting, vehicle 104B may not be selected for the ad hoc network while vehicles 104A, 104C and 104D are.

In a further example, the processor 110 may determine, for each nearby vehicle 104A-F, a common route. The common route may be a route along with each respective vehicle is expected or predicted to travel along with vehicle 100. The common route may include a measure or duration of time over which each respective nearby vehicle will be along the same route as the vehicle 100. The nearby vehicles may be ranked based on how long their common route with vehicle 100 is. And processor 110 may select one or more nearby vehicles for inclusion in the ad hoc network based on the vehicles having the longest common route (e.g., selecting the top 3 vehicles).

In further examples, vehicles may be selected based on a predicted or expected future upload rate. For instance, a given vehicle may provide guidance and route information indicating that the vehicle will be travelling to a geographic area having a higher or lower connection speed and/or upload rate. This information may be used to determine whether or not to include the vehicle in the ad hoc network.

In some examples, processor 110 may select one or more nearby vehicles for inclusion in the ad hoc network based on the respective upload rates of each nearby vehicle. For example, vehicles may be selected based a ranking of upload rates. In some examples, processor 110 may select one or more nearby vehicles based on a combined upload rate of the selected vehicles, so as to have a resulting combined upload rate above a particular threshold (e.g., 25 Mbps or more). Further, vehicles may be selected so as to have a resulting combined upload time less than a threshold duration (e.g., 5 minutes). For example, if vehicle 100 expects to take 20 minutes to upload a given set of data, additional vehicles may be added to the ad hoc network until the expected overall time to upload is reduced to below 5 minutes.

The thresholds and durations noted above are for example only, and it should be understood that other threshold and durations may be used as well. It should also be understood that processor 110 may be configured to select both a number of vehicles, and a particular subset of vehicles, based on one or more factors such as those listed above.

Processor 110 has been described above as determining a subset of the nearby vehicles to include in the ad hoc network. In some examples, processor 110 may determine a first subset of nearby vehicles that may be of use in uploading the sensor data. Determining this first subset may include using one or more of the factors described above, and removing from a list of possible candidate vehicles any vehicle that is travelling in a different direction, is not travelling on a similar route to vehicle 100, does not have an ability to upload data to server 120, or for some other reason. The first subset may then include only those vehicles that may be of use to vehicle 100 in uploading the data.

Processor 110 may then determine a second subset of vehicles from the first subset. The second subset of vehicles may be determined based on a combined upload rate or duration. As such, the second subset of vehicles may not include all possible vehicles from the first subset, but may include only those vehicles necessary to reduce the combined data upload rate or combined upload duration to a threshold level.

Once the subset of vehicles has been selected, the selected vehicles may be added to an ad hoc network including vehicle 100. Processor 110 may then be configured to separate the data gathered by the sensor 102 into segments, such that the segments can be dispersed among the selected vehicles for upload to the server 120. In some examples, segmenting can be based on the respective data upload rates of the selected vehicles. For instance, a first segment to be transferred to a first vehicle having a first, high, upload rate may be larger than a second segment to be transferred to a second vehicle having a second, low, upload rate.

In some examples, the segments may be the same size, while in other examples the segments may be of different sizes. Segment sizes may be based on the selected vehicles and/or their respective upload rates. For instance, if two vehicles are in the ad hoc network and one has a larger data upload rate than the other, the data may be segmented such that one segment is larger than the other. In other examples, the data may be separated based on a matching of upload times. This may include splitting the data into segments that may be of different sizes, such that upload of a first segment by a first vehicle requires the same or similar time as upload of a second segment by a second vehicle.

Segments may also be encrypted, such that each selected vehicle in the network is merely a node through which the data passes on to the server. The selected vehicles in the network may not be able to access the information included in each segment.

Separating the data into segments may be based on other factors as well, such as the planned routes of the selected vehicles in the network. For instance, if a selected vehicle is expected to travel into a geographical area in which it will have a higher or lower data upload rate, the data may be segmented accordingly based on that information.

Processor 110 may then be configured to transmit the segments of the data to the selected vehicles in the ad hoc network. Processor 110 may also transmit instructions for uploading the respective segments to the server 120. The data may be transmitted to the selected vehicles using the DSRC of communication system 112. The selected vehicles may receive the segments via respective communication systems (e.g., communication systems 114A-D of vehicles 104A-D, where vehicles 104A-D are selected). In some examples, other communication protocols or techniques may be used, such as an ad hoc vehicle to vehicle Wi-Fi or 5G network.

Each selected vehicle may receive one segment, or two or more segments. The instructions sent by processor 110 of vehicle 100 may include a request to upload the respective segments to the server 120 via a cellular network connection. Other protocols may be used as well.

Communication system 112 may include one or more antennas and/or systems for DSRC and/or other short range communication between vehicles, which may be referred to as V2V communication. As will be appreciated, dedicated short range communications (DSRC) is a two-way, short-range or medium-range wireless communications technology that is designed for automotive use to exchange a wide range of information in both vehicle-to-vehicle (V2V) applications and vehicle-to-infrastructure (V2I) applications. The DSRC technology has been proposed for use in a number of automotive or roadside applications, including, for example, accident reports, approaching emergency vehicle warnings, sudden braking ahead warnings, and electronic parking and toll payments. As will be appreciated, the DSRC technology permits secure, reliable communications directly between vehicles or between vehicles and roadside units (e.g., over a dedicated communications channel) and can be used to conduct point-to-point wireless communications (e.g., wireless messages directed at a specific vehicle or roadside unit), as well as to broadcast wireless messages to all vehicles and roadside units within a limited broadcast area. In the United States, DSRC is allocated for high frequency radio transmission, for example, in a dedicated 75 MHz spectrum band around 5.9 GHz.

Further, communication system 112 may include antennas and/or systems for communication with server 120, and/or one or more other computing devices or systems. As such, communication system may be configured to transmit and receive data using one or more wireless networks, such as, for example, WiFi, cellular, Bluetooth, NFC, RFID, satellite, DSRC, and infrared. In some cases, the communication system 112 may include one or more antennas, radios, modems, receivers, and/or transmitters (not shown) for connecting to, or interfacing with, the various wireless networks. In particular, the communication system 112 includes a DSRC transceiver for wirelessly communicating with other vehicles over the DSRC network. In some embodiments, the communication system 112 may also include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network.

Server 120 may be configured to receive segments from the selected vehicles, and coordinate to ensure that all the data is received. If server 120 determines that one or more segments have not been received, have been corrupted, or otherwise need to be retransmitted, server 120 may responsively send a notification to vehicle 100 indicating that the one or more segments are missing and must be retransmitted. Processor 110 may then (i) transmit the missing segment or segments, (ii) send an instruction to the vehicle or vehicles to which the missing segments were initially transmitted instructing them to retransmit, or (iii) transmit the missing segment or segments to additional vehicles in the ad hoc network.

In some examples, server 120 may determine when a selected vehicle in the network has left the network, has disconnected from communication with the server 120, or has otherwise disconnected from the ad hoc network. Processor 110 may also or alternatively be configured to make these determinations. If it is determined that a selected vehicle has lost communication, processor 110 may then add another vehicle to the network, or take some other action described herein.

Figure 2:
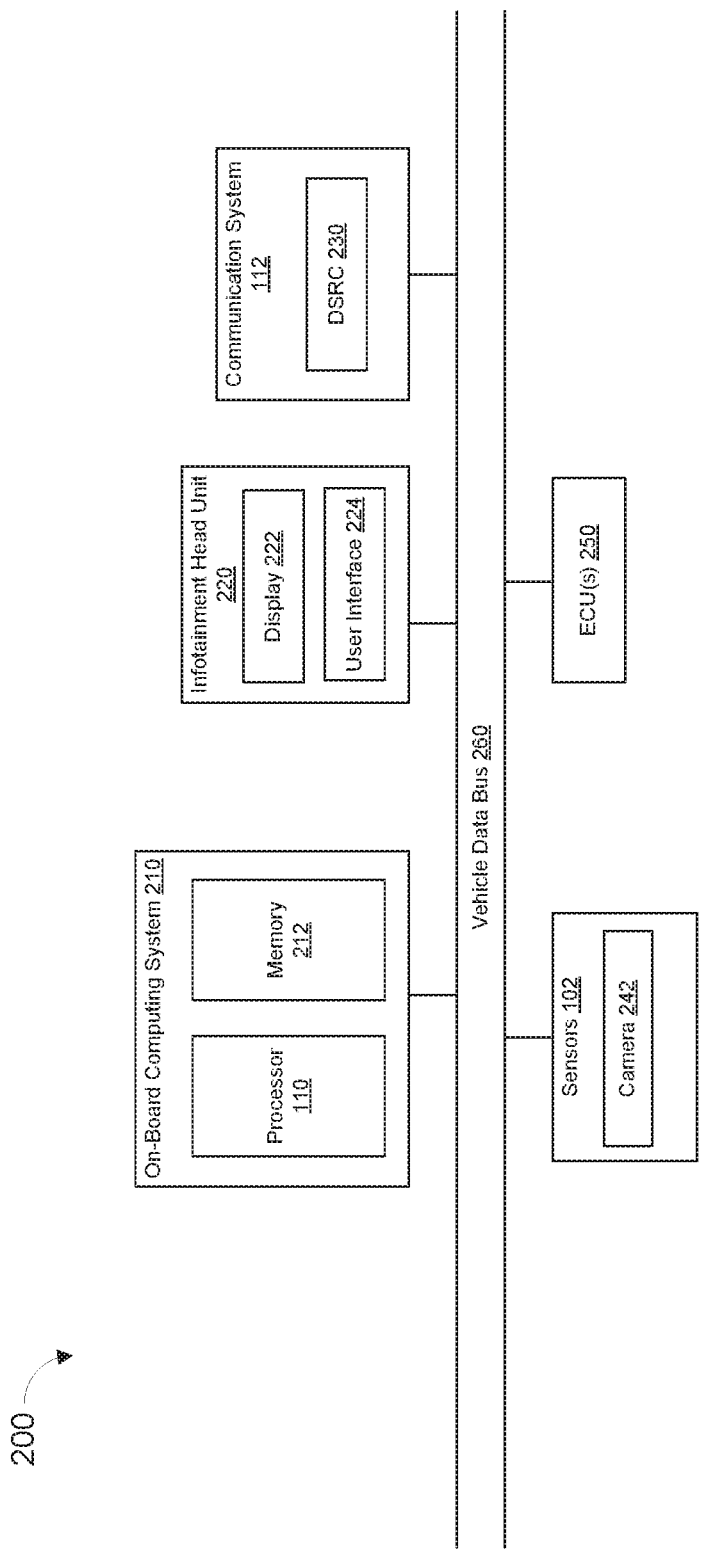
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, communication system 130, sensors 102, electronic control unit(s) 250, and vehicle data bus 260.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224. User interface 224 may include input and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a display 222 of vehicle 100. In some examples, infotainment head unit 220 may be configured to display a status of the data transfer to selected vehicles, and upload status, and various other information described herein.

Communication system 112 may be configured to communicate with one or more external computing devices, such as other vehicles, servers, and infrastructure. Communication system 112 may include a DSRC system 230.

Sensors 102 may be arranged in and around the vehicle 100 in any suitable fashion, as noted above. In the illustrated example, sensors 102 includes camera 242, configured to capture images and video of the surroundings of vehicle 100. Other sensors may be included as well.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware.

Vehicle data bus 260 may include one or more data buses that communicatively couple the on-board computing system 210, infotainment head unit 220, communication system 130, sensors 102, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7). In some examples, the CAN bus may be shared with the CAN-FD bus.

Figure 3:
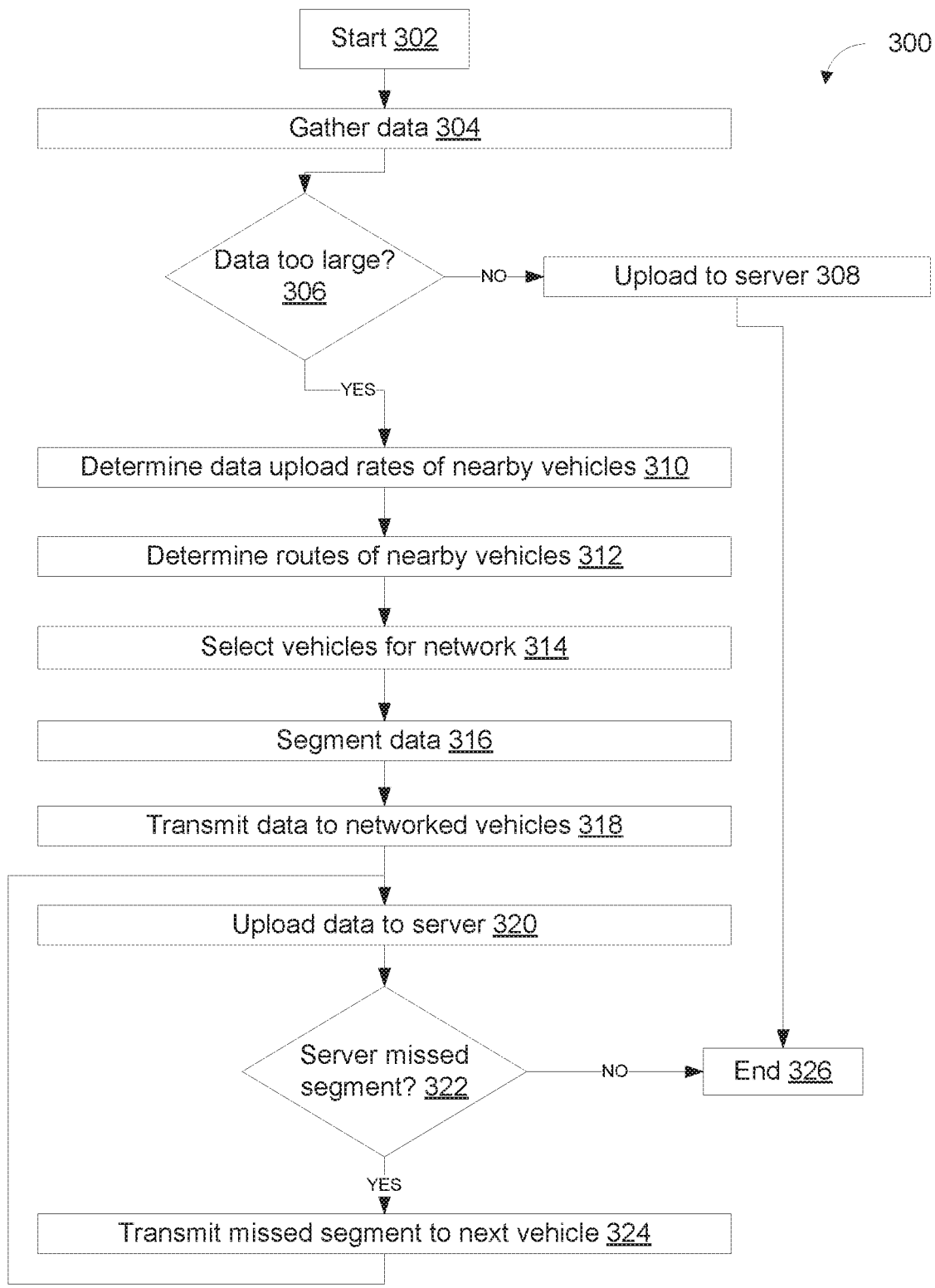
FIG. 3 illustrates a flowchart of an example method according to embodiments of the present disclosure.

FIG. 3 illustrates a flowchart of an example method 300 according to embodiments of the present disclosure. Method 300 may allow a vehicle to upload data to a server via the use of additional nearby vehicles, in order to avoid long upload times and limited upload rates of each individual vehicle. The flowchart of FIG. 3 is representative of machine readable instructions that are stored in memory (such as memory 212) and may include one or more programs which, when executed by a processor (such as processor 110) may cause vehicle 100 and/or one or more systems or devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may include gathering data to be uploaded to the server. The data may be gathered by one or more vehicle sensors, and may be used by the server to diagnose, debug, or improve the safety and operation of vehicle 100.

At block 306, method 300 may include determining whether the gathered data is too large. This may include determining whether an upload time for the data is above a threshold upload time, such as 5 minutes. Alternatively, this may include determining whether the amount of data is above a threshold, such as one gigabyte. If the data is not too large at block 306, method 300 may include uploading the data to the server at block 308. The data may be uploaded using one or more communication protocols.

If the data is too large (or the upload time is too high), method 300 may include determining the data upload rates of nearby vehicles at block 310. This may include the vehicle broadcasting a request to nearby vehicles to provide the respective upload rates, as well as various other information such as the particular communication network associated with the vehicle (e.g., ATT, Verizon, etc.).

At block 312, method 300 may include determining the routes and/or guidance information of one or more nearby vehicles. This may include predicted or expected routes of the vehicles, as well as speed, acceleration, location, and other information corresponding to each vehicle.

At block 314, method 300 may include selecting one or more vehicles to establish an ad hoc network. Selecting the vehicles may be based on one or more factors, such as the upload rates, route and guidance information, and various other factors noted above with respect to FIG. 1.

At block 316, method 300 may include separating the data into segments, and at block 318 method 300 may include transmitting the segments to the selected vehicles.

At block 320, method 300 may include uploading the data to the server. This may be done in parallel by each vehicle in the network, such that the server may receive various segments of the data out of order. The server may act as a coordinator to organize the received data, and determine whether any data is missing, corrupted, or otherwise must be retransmitted.

At block 322, method 300 may include determining whether the server has missed or not received a segment. If all data has been received by the server, method 300 may end at block 326. But if one or more segments are missing or have not been received by the server, method 300 may include transmitting the missed segment to a next vehicle. The data segment that was not received by the server may be transmitted to a separate vehicle for upload to the server, or may be uploaded by the vehicle that gathered the data itself. Method 300 may then proceed back to block 320, wherein the missing segment is uploaded to the server. This process may be repeated until all the segments are received by the server. Method 300—may then end at block 326.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A vehicle comprising:
   a sensor;
   a communication system; and
   a processor configured to:
      establish a network comprising a plurality of nearby vehicles having respective data upload rates;
      separate data gathered by the sensor into segments based on the respective data upload rates;
      determine that an upload time for the data gathered by the sensor is greater than a threshold duration; and
      responsively establish the network comprising the plurality of nearby vehicles; and
      transmit to the plurality of nearby vehicles using the communication system (i) the segments, and (ii) instructions for uploading the segments to a server.

2. The vehicle of claim 1, wherein the sensor comprises a camera, and wherein the data comprises video captured by the camera.

3. The vehicle of claim 1, wherein the processor is further configured to establish the network by selecting a subset of the plurality of nearby vehicles having the highest upload rates.

4. The vehicle of claim 1, wherein the processor is further configured to establish the network by selecting a subset of the plurality of nearby vehicles based on a comparison of planned routes of the plurality of nearby vehicles.

5. The vehicle of claim 4, wherein selecting the subset of the plurality of nearby vehicles comprises selecting the subset based on the plurality of nearby vehicles having a longest common route.

6. The vehicle of claim 1, wherein the processor is further configured to establish the network by selecting a subset of the plurality of nearby vehicles such that a combined data upload rate is above a threshold upload rate.

7. The vehicle of claim 1, wherein the processor is further configured to establish the network by selecting a subset of the plurality of nearby vehicles such that a total upload time is below the threshold duration.

8. The vehicle of claim 1, wherein the instructions for uploading the segments comprise a command to upload via a cellular network.

9. The vehicle of claim 1, wherein the processor is further configured to:
 determine that a selected segment transmitted to a first nearby vehicle has failed to be received by the server; and
 responsively transmit the selected segment to a second nearby vehicle.

10. A method for vehicle data upload comprising:
 establishing a network comprising a plurality of nearby vehicles having respective data upload rates;
 establishing the network by selecting a subset of the plurality of nearby vehicles having the highest upload rates;
 separating data gathered by a sensor into segments based on the respective data upload rates; and
 transmitting to the plurality of nearby vehicles using communication system (i) the segments, and (ii) instructions for uploading the segments to a server.

11. The method of claim 10, wherein the sensor comprises a camera, and wherein the data gathered by the sensor comprises video captured by the camera.

12. The method of claim 10, further comprising:
 determining that an upload time for the data gathered by the sensor is greater than a threshold duration; and
 responsively establishing the network comprising the plurality of nearby vehicles.

13. The method of claim 10, further comprising:
 establishing the network by selecting a subset of the plurality of nearby vehicles based on a comparison of planned routes of the plurality of nearby vehicles.

14. The method of claim 13, wherein selecting the subset of the plurality of nearby vehicles comprises selecting the subset based on the plurality of nearby vehicles having a longest common route.

15. The method of claim 10, further comprising:
 establishing the network by selecting a subset of the plurality of nearby vehicles such that a combined data upload rate is above a threshold upload rate.

16. The method of claim 10, further comprising:
 establishing the network by selecting a subset of the plurality of nearby vehicles such that a total upload time is below a threshold duration.

17. The method of claim 10, wherein the instructions for uploading the segments comprise a command to upload via a cellular network.

18. The method of claim 10, further comprising:
 determining that a selected segment transmitted to a first nearby vehicle has failed to be received by the server; and
 responsively transmitting the selected segment to a second nearby vehicle.

19. A method for vehicle data upload comprising:
 establishing a network comprising a plurality of nearby vehicles having respective data upload rates;
 establishing the network by selecting a subset of the plurality of nearby vehicles based on a comparison of planned routes of the plurality of nearby vehicles;
 separating data gathered by a sensor into segments based on the respective data upload rates; and
 transmitting to the plurality of nearby vehicles using communication system (i) the segments, and (ii) instructions for uploading the segments to a server.

20. A method for vehicle data upload comprising:
 establishing a network comprising a plurality of nearby vehicles having respective data upload rates;
 establishing the network by selecting a subset of the plurality of nearby vehicles such that a combined data upload rate is above a threshold upload rate;
 separating data gathered by a sensor into segments based on the respective data upload rates; and
 transmitting to the plurality of nearby vehicles using communication system (i) the segments, and (ii) instructions for uploading the segments to a server.

21. A method for vehicle data upload comprising:
 establishing a network comprising a plurality of nearby vehicles having respective data upload rates;
 establishing the network by selecting a subset of the plurality of nearby vehicles such that a total upload time is below a threshold duration;
 separating data gathered by a sensor into segments based on the respective data upload rates; and
 transmitting to the plurality of nearby vehicles using communication system (i) the segments, and (ii) instructions for uploading the segments to a server.

22. A method for vehicle data upload comprising:
 establishing a network comprising a plurality of nearby vehicles having respective data upload rates;
 separating data gathered by a sensor into segments based on the respective data upload rates;
 transmitting to the plurality of nearby vehicles using communication system (i) the segments, and (ii) instructions for uploading the segments to a server;
 determining that a selected segment transmitted to a first nearby vehicle has failed to be received by the server; and
 responsively transmitting the selected segment to a second nearby vehicle.

* * * * *